Jan. 6, 1970    C. A. BAREFOOT    3,487,826
ELECTROMAGNETIC CATHETER BLOOD FLOW PROBE
Filed Sept. 6, 1966
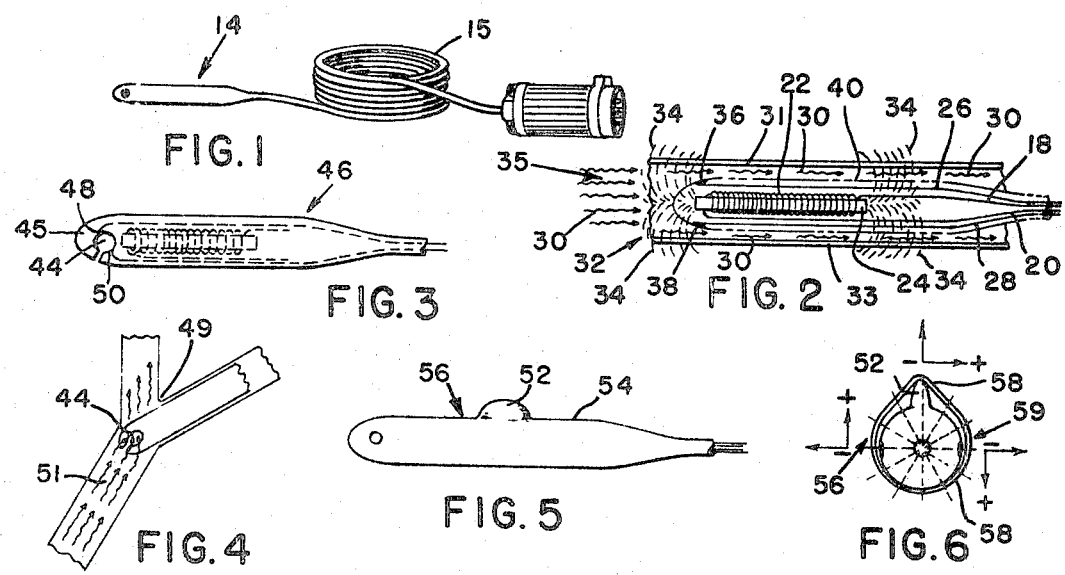
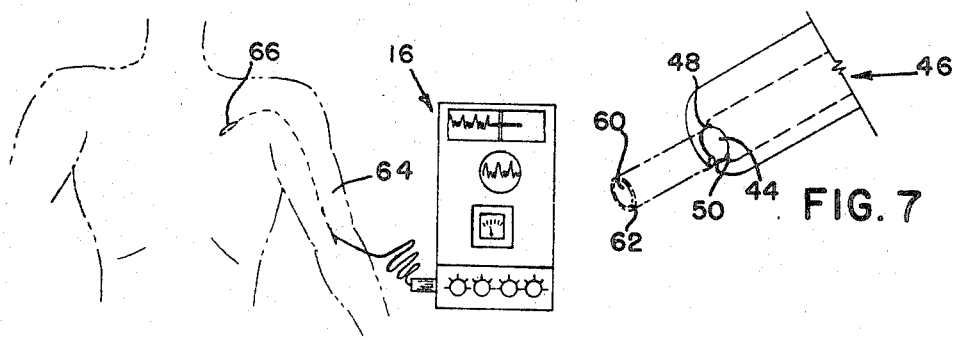
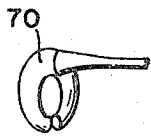
FIG.10
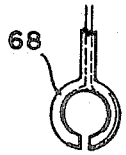
FIG.9
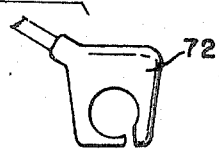
FIG.11
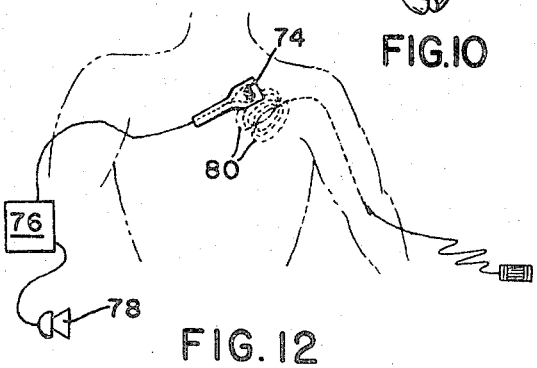
INVENTOR.
CHARLES A. BAREFOOT
BY
Charles Y. Lackey

United States Patent Office 3,487,826
Patented Jan. 6, 1970

3,487,826
ELECTROMAGNETIC CATHETER BLOOD
FLOW PROBE
Charles A. Barefoot, 328 27th St. NW.,
Winston-Salem, N.C. 27105
Filed Sept. 6, 1966, Ser. No. 577,521
Int. Cl. A61b 5/02
U.S. Cl. 128—2.05                           7 Claims

ABSTRACT OF THE DISCLOSURE

An electromagnetic blood flow catheter probe containing means for establishing a magnetic field and electrodes positioned with in the field to sense the voltage induced when blood flows through the field both of which are contained within a housing which is totally insertable within a blood vessel. This catheter probe permits blood flow readings to be taken at locations within the body where the vessel containing the probe is neither opened nor surgically exposed.

---

This invention relates generally to an instrument for measuring blood flow and more particularly to an electromagnetic catheter blood flow probe for measuring quantitatively the volumetric rate of blood flow through an unexposed and unopened blood vessel.

The applications of blood flow measurement are numerous and include primarily two basic classifications, clinical and research. Significant strides have been made first in the research laboratory where small, miniature probes of special construction have been implanted within animals, and the animals, after recovery from surgery, return to normal everyday activity without any adverse discomfort or pain. Flow data can thus be obtained daily while the animals sleep, eat, and exercise, thus supplying medical information heretofore not available.

As the medical research continues, much effort is being expended in developing techniques and instruments for studying the flow or blood which circulates through an immensely complicated system of arteries and veins. Within the clinical requirements, there is consistent need for studying the blood flow by clinicians and doctors, particularly in the aorta, pulmonary, carotid, renal, femoral, vena cava, coronary and portal vessels. One area of research which is attracting the attention of laymen and professionals alike is that of heart disease, particularly coronary disease and disorders, and the application of blood flow probes and associated equipment necessary for the complete utilization of flow measurements obtained are of extreme importance in this particular area of medicine. A major breakthrough occurred when a probe was devised which could measure the velocity and volume of blood in an unopened blood vessel though this particular development carried an associated disadvantage in that the vessel was required to be surgically exposed and sometimes severed so that it could then be inserted within the semi-circular probe configuration.

There are now two basic types of these probes being manufactured, namely the extra-corporeal probe and the non-cannulating probe, the extra-corporeal unit designed to measure blood flow in rigid tubes and pipes and the non-cannulating designed to measure blood flow through a surgically exposed but unopened blood vessel. Typical applications of the extra-corporeal probe consist of measuring flow through cardiopulmonary bypasses (heart pumps), artificial kidneys and the like.

The principle of operation of a conventonal electromagnetic probe is based upon the induction of a voltage into a conductor (blood) moving through a magnetic field. The magnitude of the induced voltage is determined by the velocity of motion, the strength of the field, and the length of the conductor. As a probe is actuated by power from one system, i.e., the flowing blood, and supplies power in another form, i.e., an induced voltage to an associated device, it is in actuality a transducer and will be interchangeably classified as such henceforth.

The transducer or probe basically consists of an electromagnet to produce a magnetic field and two electrodes for sensing the flow signal, and to be useful, the transducer must be used in conjunction with other apparatus, primarily a special power supply and amplifier combination which is called a flowmeter, a number of which are now commercially available in either the square-wave or sine-wave variety.

As the conductor in any probe is actually the blood flowing past a positioned reference point specified by the positioning of the electrodes, these electrodes for sensing the flow signal must either make direct contact with the blood or make contact with the outer surface of the vessel wall.

Since all blood flow probes have been of the extra-corporeal or non-cannulating type the application of which require that the body by surgically opened at the precise position where measurement is to be taken, the present invention is particularly significant in that it has the obvious advantage over other probes that any catheter device has, i.e., with this probe, the body need not be opened at the site where measurement is to be taken. Instead the probe can be introduced at some convenient place and pushed or passed through the vessel to the location or position where blood flow measurements are desired.

A number of outstanding advantages are inherent in the use of a catheter probe in addition to eliminating surgical exposure of the vessel at the point of measurement. Much difficulty is often experienced in attempting to apply conventional non-cannulating probes to veins since the pressure within these vessels is often not sufficient to keep the vessel wall in good contact with the electrodes of the probe. With the catheter probe, there would be no such problem since the electrodes are directly exposed within the vessel to the flow of blood.

Research has now given significant reason to believe that there is turbulence or inconsistent flow of blood within a blood vessel, and this can obviously be observed and studied more readily with a catheter probe than with a conventional device.

In all flowmeters there is a pseudo flow signal caused by the probe acting as a transformer because the alternating magnetic field used in these flowmeters induces a signal into the blood which is in turn picked up by the electrodes and mingled with the induced voltage constituting the blood flow reading. This pseudo flow signal is an annoyance because it is often difficult and sometimes impossible to distinguish it from real flow readings. The magnitude of this signal is related to the electrical impedance seen by the electrodes, and with the electrodes in direct contact with the blood rather than through the vessel wall, the catheter probe has considerably less impedance. Thus less difficulty with the pseudo flow signal is experienced.

Electromagnetic flow meters are subject to interference from electrocardiogram potentials that exist within the body which potentials appear to be weaker inside the blood vessels than otherwise. Thus the catheter probe will be less subject to interference from the EKG or ECG potentials.

Though the body is not surgically opened to position a catheter probe, precise location of that probe after it has been introduced at a convenient location into the vessel and fed to the position where flow readings are desired is conveniently accomplished since the magnetic structure of the probe opaques to X-ray so that the probe can be located with a fluoroscope. Also the flux field radiated by the electromagnet is sufficiently strong to be picked up outside the body and a coil associated with an amplifier and speaker is ordinarily used for this purpose.

With the above introductory discussion and distinctions in mind, it is therefore a primary object of the present invention to provide an electromagnetic probe for measuring quantitatively the volumetric rate of blood flow which can be introduced into the body at a convenient location and urged through blood vessels to a position where blood flow measurements are desired.

Another object of the present invention is to provide an electromagnetic catheter blood probe which can be used interchangeably with existing flowmeters.

Still another object of the present invention is to provide a catheter blood flow probe which can be located precisely at a flow measuring position without surgically exposing the blood vessel at the point of measurement.

Yet another object of the present invention is to provide a catheter blood flow probe which will consistently and accurately measure blood flow within arteries or veins despite a significant pressure differential in these two vessels and corresponding problems in measuring blood flow therein with conventional probes.

Yet still another object of the present invnetion is to provide a catheter blood flow probe which eliminates the difficulty experienced with conventional probes because of pseudo flow signals and EKG potentials which are inherent within flowmeter and body systems and affect readings accumulated when using extra-corporeal and non-cannulating probes.

These and other objects of the present invention will become apparent from a consideration of the following detailed specification taken in conjunction with the accompanying drawings constituting a part hereof in which like characters of reference designate like parts and in which:

FIG. 1 is a perspective view of an electromagnetic catheter blood flow probe showing the associated instrument cable and connector plug for joining electrically the probe components to a remotely located flowmeter;

FIG. 2 is an enlarged, sectional side elevational view of the preferred embodiment of an electromagnetic catheter blood flow probe showing the blood-contacting electrodes for sensing the induced voltage and the iron core and enveloping coil comprising the electromagnet used to establish a magnetic field of flux within and about the vessel;

FIG. 3 is a side elevational view of an alternative embodiment of a catheter blood flow probe carrying a lumen rearwardly of the extending or projecting nose portion, the lumen situated to accurately measure blood flow when an entire stream of blood is directed therethrough;

FIG. 4 is a sectional, fragmentary side elevational view of the alternative embodiment of a catheter blood flow probe shown in FIG. 3 positioned at a bifurcation of blood vessels to measure blood flowing through the lumen;

FIG. 5 is yet another alternative embodiment of an electromagnetic catheter blood flow probe which carries a fin or projecting bump to stablize the probe within the blood vessel interior;

FIG. 6 is a sectional enlarged, and elevational view of the probe illustrated in FIG. 5 showing the radiating flux field extending from the core of the magnet contained therein and the operation of the fin to sustain the probe in a consistent position against the vessel wall;

FIG. 7 is a sectional, fragmentary, perspective view of the alternative embodiment of the catheter probe shown in FIG. 3 used as a non-cannulating probe to measure blood flow in a small blood vessel;

FIG. 8 is a front elevational, sectional view of a catheter blood flow probe associated with a flowmeter which has been inserted into a human being through a convenient surgical incision made at a location remote from the location of desired flow measurement, i.e., the patient's arm;

FIG. 9 is a front elevational view of a conventional non-cannulating electromagnetic probe normally used for large blood vessels which constitutes a part of the prior art and requires the surgical exposure of the blood vessel at the point of flow measurement;

FIG. 10 is a perspective view of another variety of a conventional non-cannulating probe constituting a part of the prior art;

FIG. 11 is an end elevational view of yet another variation of a non-cannulating probe constituting a part of the prior art; and FIG. 12 is a front elevational, sectional view of a catheter blood flow probe within a human being illustrating the location and positioning of that probe by detecting its magnetic field with a coil and amplifying to obtain an audio signal.

Referring now to the drawings and particularly to FIG. 1, there is shown a catheter probe generally designated 14 with an instrument cable supply 15 connected there to terminating in a connector for attachment to a flowmeter generally designated 16. The cable 15 is conventionally formed from two shielded smaller cables (not shown), the first shielded cable retaining the leads 18 and 20 which energize the coil 22 surrounding core 24 all of which cooperate to form an electromagnet. The second shielded cable contains leads 26 and 28 which connect to the electrodes 36 and 38 that actually physically contact blood 30 flowing within the walls 31 and 33 of a blood vessel generally designated 35 (see arrows).

The opposition to a current change is essentially an effect of electromagnetic induction or induced electromotive force. A voltage is induced in a conductor when ever the conductor is moved across a magnetic field. The same thing also happens when the magnetic field is moved across a conductor. It is this relative motion between field and conductor that produces self-induced voltage in a conductor. Thus magnetic flowmeters depend on the induction of voltage in a fluid flowing in a magnetic field. The voltage will be induced at right angles to the direction of motion and to the magnetic field, and the induced voltage polarity depends upon the polarity of the field and the direction of the conductor's motion. Its magnitude is determined by the velocity of motion, the strength of the field and the length of the conductor.

The field of magnetic flux generally designated 32 is formed from individual flux lines 34 radiating in symmetrical fashion from the ends of the electromagnet formed by coil 22 wrapped about core 24 which is oriented in substantially a straight line. Once the electromagnet is assembled, electrodes 36 and 38 are positioned opposite from each other in the flux field 32 and then connected to conductors 26 and 28 which are directly secured to a flowmeter 26. It is of course, necessary to retain electrodes 36 and 38 in a fixed immovable relationship each to the other and each to the electromagnetic field established by coil 22 wound about core 24. In order to firmly establish this space-apart relationship between these components, an epoxy resin is molded about the entire assembly to form a housing 40 in a manner to permit electrodes 36 and 38 to protrude through the housing 40 and contact directly blood flowing thereby. The epoxy-resin is usually of a clear or transparent mixture so as to allow visual inspection of the components as they are retained in their very sensitive relationship each with the other.

Blood 30 flowing in a vessel 35 containing a catheter probe 14 flows transversely with respect to the magnetic flux line 34 thus generating a signal in a direction transverse to the blood flow and to the magnetic flux. The signal potential generated is detected between electrodes 36 and 38 which signal is then in turn amplified and converted to a DC voltage proportional to the volumetric flow rate and then made available for visual presentation, computation or storage through the electromagnetic flowmeter 16 associated with the probe.

A number of innovations have been developed with respect to the basic catheter blood flow probe including the retention of a lumen 44 within the projecting nose 45 of a modified probe generally designated 46, which lumen has exposed for blood contact within its periphery electrodes 48 and 50. The particularly modified blood flow probe is most effective when it can be done at a bifurcation of blood vessels 49 such as illustrated in FIG. 4 so that the lumen can be inserted into the flow stream 51 and all flow will pass therethrough.

An added feature can be incorporated on some variations of the catheter probe to stabilize the probe within the vessel, this feature particularly involving the formation of a fin or bump 52 extending from the exterior surface 54 of yet another modified probe generally designated 56. The functioning of this fin 52 is best illustrated in FIG. 6 where the fin is urged against the wall 58 of a blood vessel 59 to position the probe 56 against the vessel wall 58. For the probe to function, it must lie against the vessel wall since the electrical voltage above and below the probe is opposite in polartiy. If the probe is located in the center of the vessel, these voltages will be equal in magnitude and thus cancelled. This is best illustrated by the flux-voltage-motion orthogonal vectors taken in three positions about the probe in FIG. 6. The generated voltage vector is perpendicular to an extended radius from the mid-point of the probe and is designated with a polarity such as shown in FIG. 6. Thus only when the probe is positioned within the vessel so the the generated signal voltage vectors do not cancel out can there be a reading obtained and indicated on the associated equipment.

A further application of the modified probe 46 containing a lumen 44 is depicted in FIG. 7. There the catheter probe is used as a non-cannulating type probe formed by simply inserting a small blood vessel 60 within the lumen 44 so that electrode 48 and 50 contact the wall 62 of the vessel and function in a conventional manner.

FIG. 8 illustrates the most significant feature in the utilization of a catheter blood flow probe, i.e., the body need not be opened at the site where the blood flow measurement is to be taken. Instead the probe can be introduced at some convenient place such as the arm 64 and urged through the particular vessel to a location 26 where blood flow measurement is required.

The flowmeter 16 associated with the present invention must perform several functions for the probe in that it must supply an energizing signal to produce the magnetic field 32, receive the flow induced signal between electrodes 36 and 38, amplify that signal and then convert it to a DC voltage proportional to the volumetric flow rate. This signal is then made available for visual presentation, computation or storage. There are several types of electromagnetic flowmeters, and they are normally identified according to the wave shape of the energizing signal which produces the magnetic field in the transducer or probe. The square-wave flowmeter principle permits effective separation of the flow signal from undesirable quadrature effects which cause instability in sinewave meters. Representative of more recently developed flowmeters in United States Letters Patent No. 3,263,500 relating to a magnetic flowmeter issued Aug. 2, 1966.

FIGS. 9, 10 and 11 illustrate a variety of non-cannulating transducers or probes constituting a part of the prior art and significantly emphasizing and decided change brought about the invention of the present concept for a catheter blood flow probe. An almost semi-circular non-cannulating probe 68 has been normally used for large blood vessels while a more specialized probe 70 has commonly been adapted for use with difficultly positioned vessels.

Another variation 72 is available for use with or without a snap-on cap (not shown) to retain the blood vessel within an entirely circular surrounding.

Particularly useful in the application and utilization of a catheter blood flow probe is an associated and cooperating device for precisely locating that probe once it has been introduced into a body blood vessel. The probe can be located with a fluoroscope, however, a simpler operation involves merely the use of a pick-up coil 74 connected to an amplifier 76 and speaker 78 which will detect the field 80 radiated by the magnet and emit an audio signal when the coil nears the strong portion of the field very near the magnet core. The use of such an associated device is of tremendous value in precision flow measurement utilizing catheter probes.

Electromagnetic flowmeters are subject to interference from electrocardiogram potentials that exist within the body, and these potentials appear to be weaker inside the blood vessels than along the vessel wall or surface. Thus the catheter probe appears to be less subject to interference from these potentials and less likely to be affected in final readings than would be conventional probes.

While the core 24 shown in FIG. 2 is constructed in substantially a straight line, these cores can be slightly curved and it has been found advantageous to produce such curved cores in order to help maneuver the probe around sharp bends in blood vessels.

Obviously, many modifications and variations may be made in the construction and arrangements of the electromagnet, the electrodes, the shape of the stabilizing fin and the body housing as well as other phase of the present inventive concept in light of the above teachings without departing from the real spirit and purpose of this invention. Such modifications of parts and alternative as well as the use of mechanical and electrical equivalents to those herein illustrated and described are reasonably included and modifications are contemplated.

What is claimed is:

1. An electromagnetic catheter blood flow probe for detecting a voltage induced by conductive blood moving within the walls of an unopened blood vessel, said probe comprising: a housing insertable within the blood vessel; magnetic means within said housing establishing a flux field proximate blood flow; an electrode means affixed to the exterior surface of said housing contiguous with the blood lying within the flux field to sense an induced voltage generated when conductive blood flows through the flux field and about the exterior surface of said housing, the induced voltage being proportional to the volumetric flow rate of blood passing through the flux field and said housing maintaining said magnetic means and electrode means in a fixed relationship each with the other.

2. An electromagnetic catheter blood flow probe according to claim 1, said housing being elongated and of substantially circular cross section and said magnetic means including a substantially linear core extending longitudinally of said elongated housing and a coil wound about said linear core.

3. An electromagnetic catheter blood flow probe according to claim 1, said housing having a stabilizing fin extending from its exterior to stabilize and position the probe within the blood vessel.

4. An electromagnetic catheter blood flow probe according to claim 2, said electrode means comprising two conductive electrodes positioned at one end of said housing and opposite to each other on the surface of said housing.

5. An electromagnetic catheter blood flow probe according to claim 2, said housing having a stabilizing fin extending from its exterior to stabilize and position the probe within the blood vessel.

6. An electromagnetic catheter blood flow probe according to claim 5, said electrode means comprising two conductive electrodes positioned at one end of said housing and opposite to each other on the surface of said housing.

7. An electromagnetic catheter blood flow probe according to claim 6, said electrode means having shielded leads extending from said two electrodes through the entire length of said housing and outwardly therefrom, and said magnetic means including shielded leads extending from said wound core through the entire length of said housing and outwardly therefrom.

References Cited

UNITED STATES PATENTS

| | | | |
|---|---|---|---|
| 3,308,819 | 3/1967 | Arp | 128—221 X |
| 3,347,224 | 10/1967 | Adams | 128—2.05 |

OTHER REFERENCES

Spencer et al.; "Ire. Transactions on Medical Electronics, vol. BME–6, No. 4, December 1959, pp. 220–228.

WILLIAM E. KAMM, Primary Examiner